United States Patent
Wei et al.

(10) Patent No.: US 11,889,445 B2
(45) Date of Patent: Jan. 30, 2024

(54) INFRASTRUCTURE EQUIPMENT, COMMUNICATIONS DEVICE AND METHODS

(71) Applicant: Sony Corporation, Tokyo (JP)

(72) Inventors: Yuxin Wei, Basingstoke (GB); Samuel Asangbeng Atungsiri, Basingstoke (GB); Hideji Wakabayashi, Basingstoke (GB)

(73) Assignee: SONY CORPORATION, Tokyo (JP)

(*) Notice: Subject to any disclaimer, the term of this patent is extended or adjusted under 35 U.S.C. 154(b) by 125 days.

(21) Appl. No.: 17/253,141

(22) PCT Filed: Jun. 6, 2019

(86) PCT No.: PCT/EP2019/064882
§ 371 (c)(1),
(2) Date: Dec. 17, 2020

(87) PCT Pub. No.: WO2019/243078
PCT Pub. Date: Dec. 26, 2019

(65) Prior Publication Data
US 2022/0159602 A1    May 19, 2022

(30) Foreign Application Priority Data
Jun. 20, 2018    (EP) .................................... 18178838

(51) Int. Cl.
*H04W 56/00*    (2009.01)
*H04W 24/06*    (2009.01)
(52) U.S. Cl.
CPC ....... *H04W 56/0045* (2013.01); *H04W 24/06* (2013.01); *H04W 56/002* (2013.01)
(58) Field of Classification Search
None
See application file for complete search history.

(56) References Cited

U.S. PATENT DOCUMENTS

| | | | |
|---|---|---|---|
| 8,259,636 B2 * | 9/2012 | Hus ....................... | H04L 1/1607 370/312 |
| 9,986,005 B2 * | 5/2018 | Sim ................... | H04N 21/43615 |

(Continued)

FOREIGN PATENT DOCUMENTS

| WO | 2009/148751 A2 | 12/2009 |
|---|---|---|
| WO | 2017/085024 A1 | 5/2017 |

OTHER PUBLICATIONS

International Search Report and Written Opinion dated Oct. 16, 2019, received for PCT Application No. PCT/EP2019/064882, Filed on Jun. 6, 2019, 16 pages.

(Continued)

*Primary Examiner* — Khaled M Kassim
*Assistant Examiner* — Berhanu D Belete
(74) *Attorney, Agent, or Firm* — XSENSUS LLP

(57) ABSTRACT

An infrastructure equipment forming part of a wireless communications network is provided. The infrastructure equipment comprises transceiver circuitry configured to transmit signals to and to receive signals from communications devices via a wireless access interface provided by the wireless communications network, and controller circuitry. The controller circuitry is configured in combination with the transceiver circuitry to determine a delay time for each of a plurality of communications devices, the delay time being a time taken for the each of the communications devices to receive signals transmitted by the infrastructure equipment, to set a playback time dependent on a longest of the delay times among the plurality of communications devices, the playback time being a time at which one or more of the communications devices should transmit a signal, and to transmit signals to each of the communications devices, the signals comprising an indication of the playback time.

18 Claims, 5 Drawing Sheets

(56) References Cited

U.S. PATENT DOCUMENTS

| | | | |
|---|---|---|---|
| 10,009,413 B2* | 6/2018 | Wohlert | H04L 65/80 |
| 11,166,065 B1* | 11/2021 | Camargo | H04N 21/4318 |
| 11,297,369 B2* | 4/2022 | Iyer | H04N 21/43615 |
| 11,349,586 B2* | 5/2022 | Koshiji | H04J 3/0673 |
| 11,438,644 B1* | 9/2022 | Camargo | H04N 21/4318 |
| 2005/0129058 A1* | 6/2005 | Casaccia | H04W 84/12 |
| | | | 370/464 |
| 2006/0098735 A1* | 5/2006 | Chang | H04N 19/533 |
| | | | 375/E7.101 |
| 2007/0071025 A1* | 3/2007 | Bergstrom | H04L 1/1887 |
| | | | 370/448 |
| 2010/0217887 A1* | 8/2010 | Bouazizi | H04L 65/70 |
| | | | 709/246 |
| 2010/0263047 A1* | 10/2010 | Denninghoff | H04L 12/189 |
| | | | 726/22 |
| 2011/0053513 A1* | 3/2011 | Papakostas | H04L 67/306 |
| | | | 455/67.11 |
| 2011/0129194 A1* | 6/2011 | Nakao | H04N 21/4302 |
| | | | 386/E5.032 |
| 2012/0099419 A1* | 4/2012 | Kim | H04L 1/1854 |
| | | | 370/216 |
| 2012/0144435 A1* | 6/2012 | Spilo | H04N 21/43615 |
| | | | 725/78 |
| 2014/0032778 A1* | 1/2014 | Sim | H04N 21/43076 |
| | | | 709/232 |
| 2015/0120953 A1* | 4/2015 | Crowe | H04N 21/6547 |
| | | | 709/231 |
| 2015/0195590 A1* | 7/2015 | McCoy | H04N 21/4302 |
| | | | 725/28 |
| 2015/0379949 A1 | 12/2015 | Wang et al. | |
| 2016/0127728 A1* | 5/2016 | Tanizawa | H04N 19/40 |
| | | | 375/240.02 |
| 2016/0255129 A1* | 9/2016 | Walker | H04L 69/326 |
| | | | 709/219 |
| 2017/0118683 A1* | 4/2017 | Son | H04W 36/023 |
| 2018/0041913 A1* | 2/2018 | Zhu | H04L 65/65 |
| 2019/0253847 A1* | 8/2019 | Proctor | H04W 4/08 |
| 2021/0084474 A1* | 3/2021 | Kaplita | H04L 65/75 |

OTHER PUBLICATIONS

Walewski et al., "5G Communication for Automation in Vertical Domains", 3GPP, Mar. 14, 2017, 2 pages.

Huawei et al., "Mobile-Edge Computing", Introductory Technical White Paper, Issue 1, Sep. 2014, pp. 1-36.

RCR Wireless News, "RCR Wireless Intelligence on all things wireless", IEEE 1588v2A Look at Time and Frequency Synchronization, Fundamentals, Wireless, May 13, 2014, 5 pages.

Jeff Gao, "SC-PTM, an agile broadcast/multicast mechanism", 3GPP, Jan. 28, 2016, 2 pages.

* cited by examiner

INFRASTRUCTURE EQUIPMENT, COMMUNICATIONS DEVICE AND METHODS

CROSS-REFERENCE TO RELATED APPLICATIONS

The present application is based on PCT filing PCT/EP2019/064882, filed Jun. 6, 2019, which claims priority to EP 18178838.1, filed Jun. 20, 2018, the entire contents of each are incorporated herein by reference.

BACKGROUND

Field of Disclosure

The present disclosure relates to infrastructure equipment and communications devices, and specifically to improving synchronicity between a plurality of communications devices.

This application claims the Paris Convention priority of European patent application no. EP18178838, the contents of which are hereby incorporated by reference.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

Another example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of terminal devices associated with different traffic profiles gives rise to new challenges for efficiently handling communications in wireless telecommunications systems that need to be addressed.

SUMMARY OF THE DISCLOSURE

The present disclosure can help address or mitigate at least some of the issues discussed above.

Embodiments of the present technique can provide an infrastructure equipment forming part of a wireless communications network. The infrastructure equipment comprises transceiver circuitry configured to transmit signals to and to receive signals from communications devices via a wireless access interface provided by the wireless communications network, and controller circuitry. The controller circuitry is configured in combination with the transceiver circuitry to determine a delay time for each of a plurality of communications devices, the delay time being a time taken for the each of the communications devices to receive signals transmitted by the infrastructure equipment, to set a playback time dependent on a longest of the delay times among the plurality of communications devices, the playback time being a time at which one or more of the communications devices should transmit a signal, and to transmit signals to each of the communications devices, the signals comprising an indication of the playback time.

Embodiments of the present technique, which further relate to infrastructure equipment, methods of operating communications devices and infrastructure equipment and circuitry for communications devices and infrastructure equipment, allow for the improvement in synchronicity between communications devices (UEs) which can ensure time-critical cooperative tasks are performed by the UEs at the correct time.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1A:
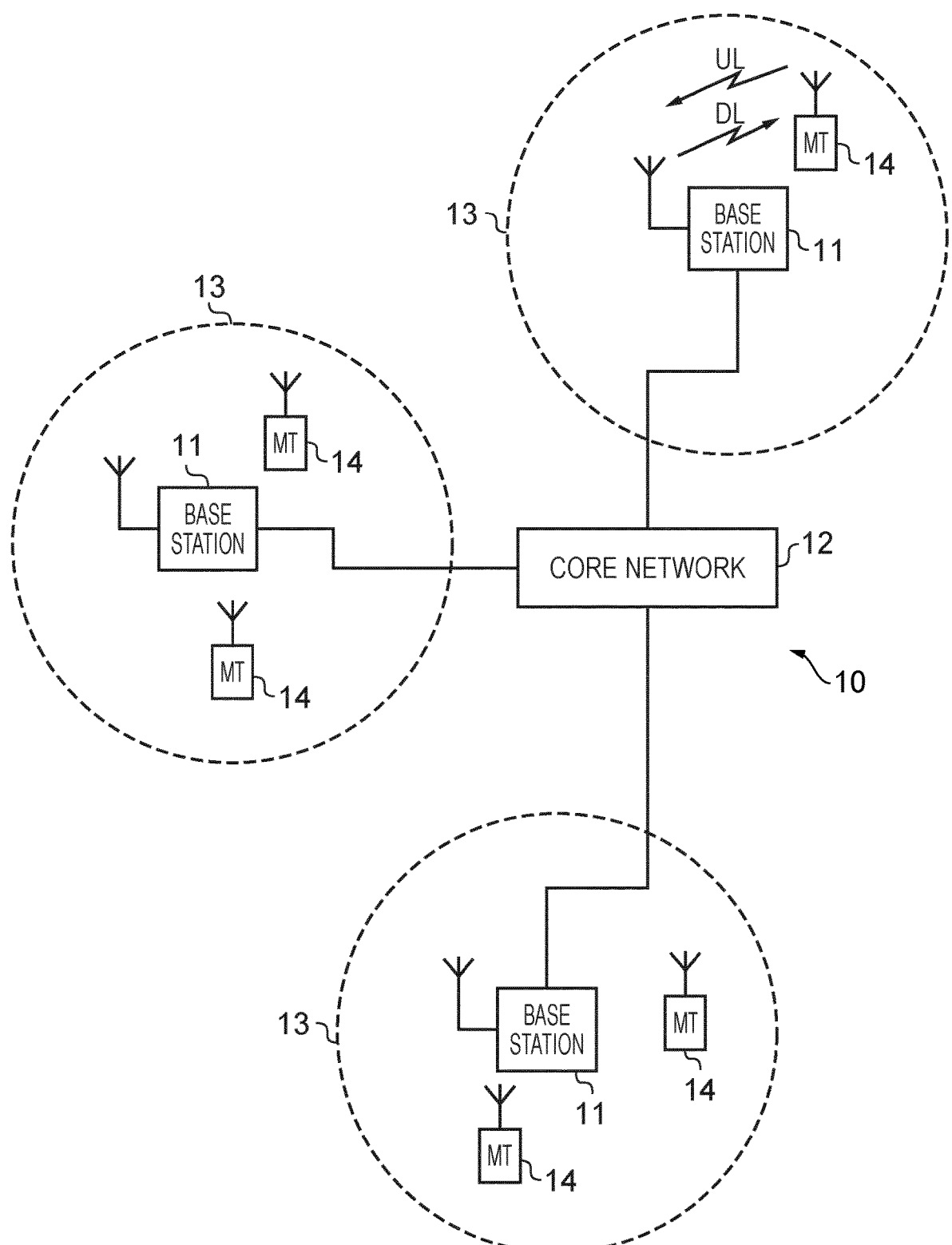
FIG. 1a schematically represents some aspects of an LTE-type wireless telecommunication system which may be configured to operate in accordance with certain embodiments of the present disclosure.

FIG. 1a provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1a and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present invention can also find application with advanced wireless communications systems such as those referred to as 5G or New Radio (NR) Access Technology. The use cases that are considered for NR include:
Enhanced Mobile Broadband (eMBB)
Massive Machine Type Communications (mMTC)
Ultra Reliable & Low Latency Communications (URLLC) [2]

eMBB services are characterised by high capacity with a requirement to support up to 20 Gb/s. The requirement for URLLC is a reliability of $1\text{-}10^{-5}$ (99.999%) for one transmission of a 32 byte packet with a user plane latency of 1 ms [3].

The elements of the wireless access network shown in FIG. 1a may be equally applied to a 5G new RAT configuration, except that a change in terminology may be applied as mentioned above.

Figure 1B:
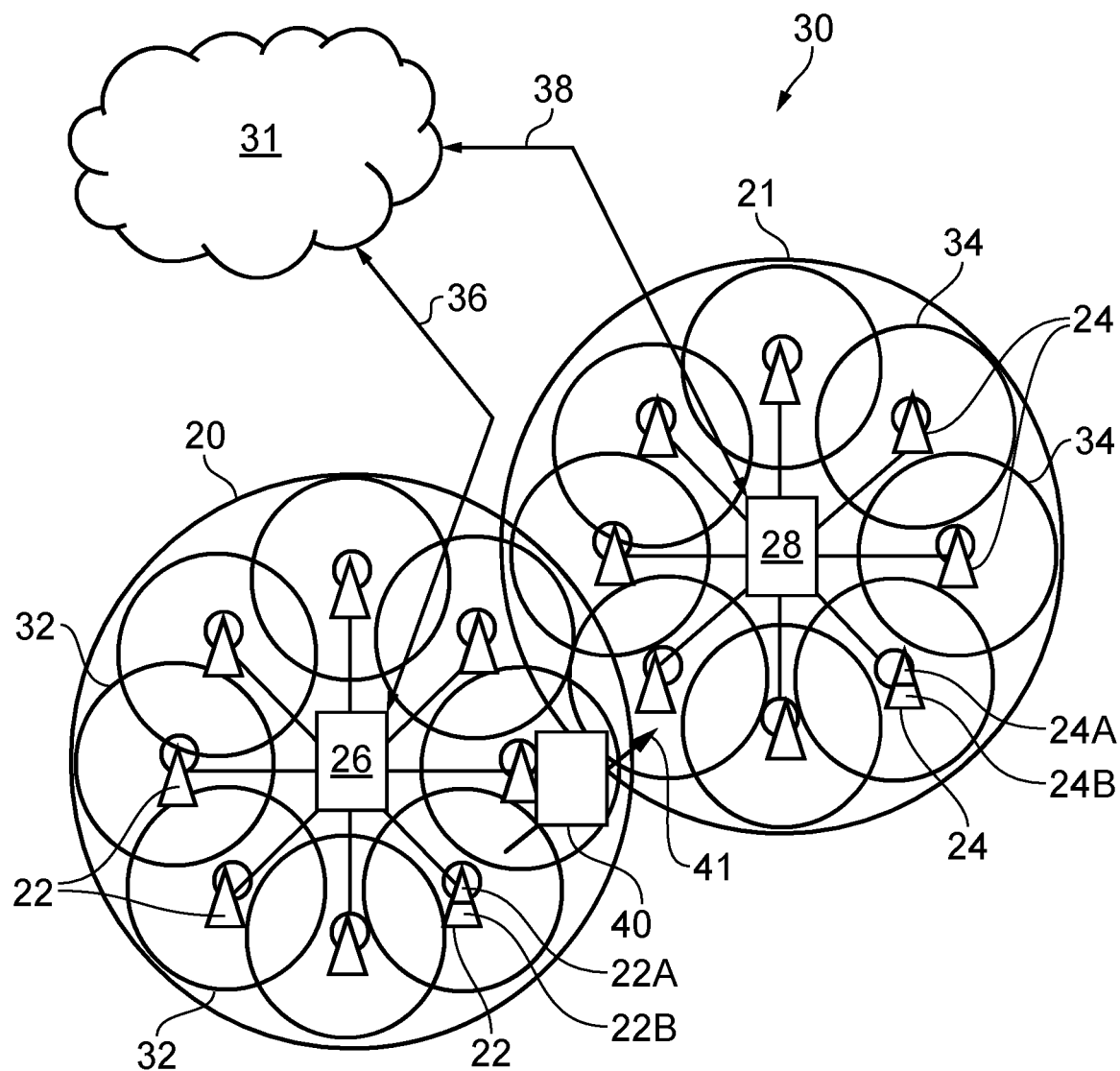
FIG. 1b schematically represents some aspects of a new radio access technology (RAT) wireless telecommunications system which may be configured to operate in accordance with certain embodiments of the present disclosure.

FIG. 1b is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 1b comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 1b may be broadly considered to correspond with the core network 12 represented in FIG. 1a, and the respective controlling nodes 26, 28 and their associated distributed units/TRPs 22, 24 may be broadly considered to provide functionality corresponding to base stations of FIG. 1a. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 1b within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device 40 and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 1b, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 1b represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1a and 1b.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1a which is adapted to provide functionality in accordance with the principles described herein, and in other examples the network infrastructure equipment may comprise a control unit/controlling node 26, 28 and/or a TRP 22, 24 of the kind shown in FIG. 1b which is adapted to provide functionality in accordance with the principles described herein.

Ultra Reliable Low Latency Communications (URLLC)

Ultra reliable low latency communications (URLLC) service, have recently been proposed within 3GPP for 4G and 5G communications networks. In some examples, URLLC communications are either low latency (where the user plane latency target is 1 ms) or high reliability (where the acceptable error rate on URLLC transmissions is $10^{-5}$) or both low latency and high reliability (where both the latency and reliability targets need to be met at the same time).

Various techniques have been proposed in order to achieve the low latency and high reliability targets. Low latency can be achieved through one or more of the following techniques (which can be applied in combination):

Short scheduling interval. Transmissions can be scheduled at frequent intervals. The scheduling interval may be less than the duration of a slot in the frame (e.g. when the slot duration is 1 ms, it may be possible to schedule URLLC every 0.1 ms, i.e. with a scheduling interval of 0.1 ms).

Short TTI. The transmission time interval (TTI) of a URLLC transmission may consist of a small number of OFDM symbols (i.e. much smaller than the duration of a slot).

On the fly decoding format. The format of the URLLC transmission may be designed to allow for "on the fly decoding". For example, reference symbols for channel estimation purposes may be located in the first OFDM symbol of the URLLC transmission and each OFDM symbol within the URLLC transmission can be decoded independently of other OFDM symbols (e.g. one OFDM symbol contains a whole forward error correction (FEC) codeword).

The short TTI referred to above can be termed a "mini-slot". The scheduling interval may also have an extent of a mini-slot.

High reliability can be achieved through one or more of the following techniques (which can be applied in combination):

Frequency diverse transmissions: Transmission of the URLLC information over a wide bandwidth makes those transmissions resilient to frequency selective fading.

Antenna diversity: Antenna diversity makes the URLLC transmission resilient to frequency selective fading on some of the channels between transmit and receive antennas.

Robust coding and modulation: Use of powerful forward error correction codes and robust modulation formats increases the resilience of the URLLC transmission to noise.

Hybrid ARQ: The URLLC transmission is protected with a cyclic redundancy check (CRC). If the CRC indicates that the URLLC packet is incorrect, the receiver can inform the transmitter of the error and the packet can be re-transmitted.

Repetition: The URLLC transmission can be repeated, such that if an initial reception of the packet fails, a second reception of the packet can be combined with the first reception of the packet to increase the effective signal to noise ratio (SNR) of the received packet and allow decoding of the packet.

Figure 2:
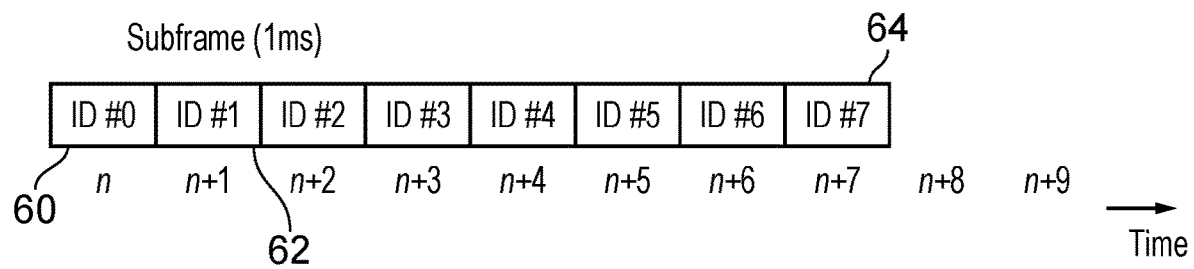
FIG. 2 illustrates an example of synchronous hybrid automatic repeat request (HARQ) operation for a physical uplink shared channel (PUSCH) with 8 HARQ processes.

Packet duplication: URLLC packets can be sent over two cells configured either as carrier aggregation (CA) or dual connectivity (DC). Packet duplication is performed in PDCP layer for both CA and DC HARQ Transmission in LTE In LTE, synchronous Hybrid ARQ (HARQ) transmission is supported for PUSCH (uplink) transmission where the HARQ process ID is linked to the subframe, that is, the eNB and UE know which HARQ process is being addressed based on the subframe being processed. In LTE for FDD, there are 8 HARQ processes as shown in FIG. 2 and the HARQ process ID increases in order, for example, if at subframe n 60 the HARQ process ID is 0, then in subframe n+1 62 the HARQ process ID is 1 and so on and the HARQ process ID reverts back to 0 after the $8^{th}$ HARQ process 64, i.e. with ID 7.

Figure 3:
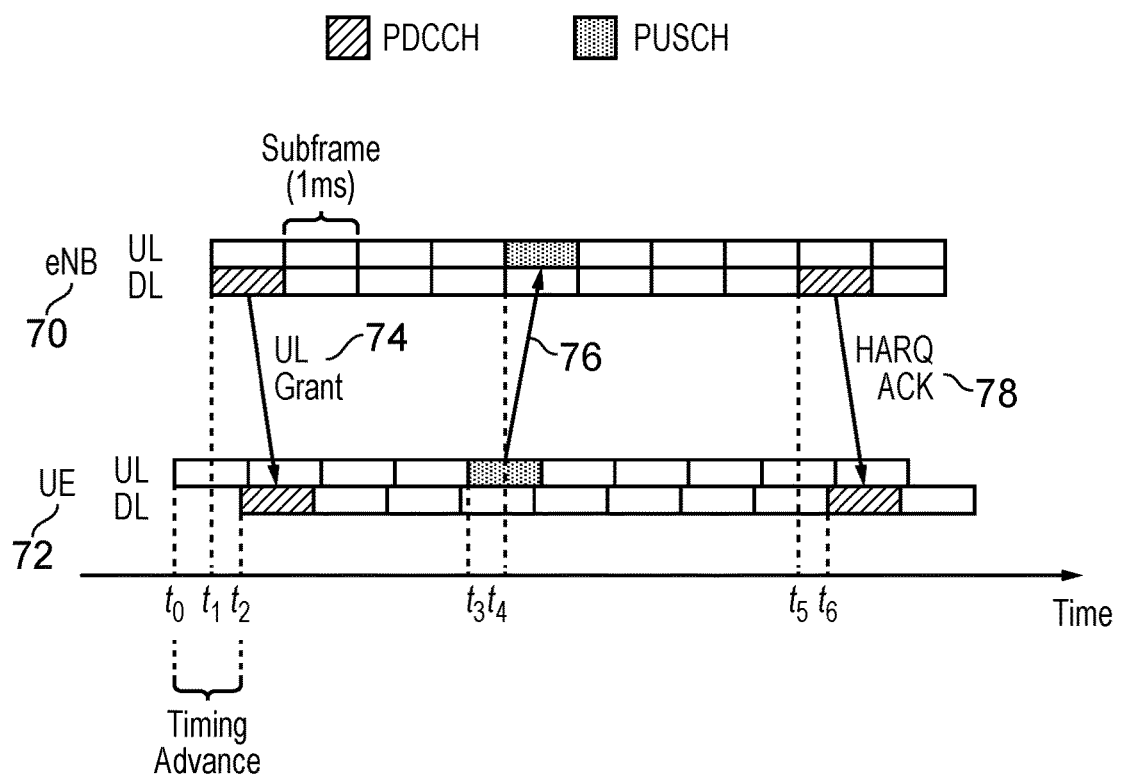
FIG. 3 illustrates an example of a PUSCH HARQ time line.

For PUSCH transmission in LTE, the delay between the PUSCH transmission and the uplink grant and the delay between the uplink HARQ feedback (HARQ-ACK) and the PUSCH transmission are fixed to 4 subframes (i.e. 4 ms). Hence the eNB and UE know when a PUSCH transmission for a specific HARQ process ID is transmitted over the air and when the corresponding HARQ-ACK is expected, without any signalling for the time resource and HARQ process ID. An example is shown in FIG. 3, where the eNB 70 transmits a PDCCH (or EPDCCH) carrying a DCI with an uplink grant 74 (containing scheduled resources for PUSCH) for a UE 72 at time $t_1$, which is received at the UE 72 at time $t_2$ after propagation delay. The time resource, e.g. subframe, for the transmission of the PUSCH 76 is not indicated in the uplink grant 74 but is known to occur four subframes later after the uplink grant 74 at time $t_3$, which is received by the eNB 70 at time $t_4$. Note that due to timing advance the PUSCH is transmitted 76 in advance to account for propagation delay between the eNB 70 and UE 72. The UE 72 would then expect an uplink HARQ-ACK 78 from the eNB 70 four subframes later at time $t_6$.

The type of uplink HARQ-ACK can be adaptive or non-adaptive. In an adaptive HARQ system, the uplink HARQ-ACK is an uplink grant in a DCI carried by a PDCCH (or EPDCCH). Here the DCI will indicate whether this uplink grant is for a new Transport Block (TB) or whether it is a retransmission and it can schedule a different resource (e.g. frequency resource) for the retransmission. LTE also uses non-adaptive HARQ and in LTE, the uplink HARQ-ACK is carried by PHICH (Physical Hybrid-ARQ Indicator Channel) which has 1 bit of information to indicate an ACK (i.e. the PUSCH TB is received successfully) or a NACK (i.e. failed to receive the PUSCH TB). The PHICH does not signal the resource for the PUSCH retransmission but a NACK would implicitly indicate that the same resource used for the previous PUSCH transmission will be scheduled for the PUSCH retransmission.

HARQ Transmission in NR

In NR, an asynchronous HARQ is used for PUSCH transmission, where unlike LTE, there is no fixed association between the subframe and the HARQ process ID. This allows the time resource (i.e. the slot) for PUSCH transmission to be flexible, that is, the time resource (i.e. slot) and HARQ process ID for PUSCH transmission are indicated in the uplink grant.

Unlike LTE where an explicit uplink HARQ-ACK is provided by the eNB at a known time (i.e. 4 subframes after PUSCH transmission), in NR an implicit HARQ-ACK is provided. That is a PUSCH TB of a HARQ process is ACKed (positively acknowledged) if an uplink grant indicates a new PUSCH TB is scheduled (toggling the New Data Indicator bit, potentially the NDI functionality is provided by "Code Block Group Indicator" bits) for the same HARQ process. The PUSCH TB of a HARQ process is NACKed (negatively acknowledged) if an uplink grant does not indicate a new PUSCH TB is scheduled for the same HARQ process and here the resources scheduled are used for retransmission of the PUSCH TB. Therefore unlike LTE, the UE does not know when or whether any uplink HARQ-ACK is transmitted. It should be noted that there may not be any uplink HARQ-ACK feedback at all if there is no new data transmission.

As described above, for URLLC the PUSCH TB needs to have high reliability and low latency.

Since in NR the UE does not know when the uplink HARQ-ACK is expected, it is difficult for the UE to determine whether its uplink URLLC transmission is successfully received. This therefore has an impact on the reliability requirement of URLLC. Recognising this, 3GPP proposed to introduce explicit HARQ-ACK for URLLC transmission.

It should be appreciated that the 3GPP NR specifications do not distinguish a PUSCH transmission as URLLC or eMBB but from the layer 1 point of view, it is merely data transmission (i.e. layer 1 is agnostic as to whether the transmission is URLLC or eMBB). Hence, the introduction of explicit HARQ-ACK targeting URLLC transmissions imposes a challenge since layer 1 does not distinguish whether the transmission is for URLLC or eMBB.

FS_CAV

The FS_CAV study in SA1 [4] outlines some applications of high capacity URLLC and their requirements. Amongst these applications are, for example, special events production with multi-dimensional sound play-back from multiple wireless speakers acting as UEs, and complementary actuations between robots acting as UEs in order to execute a task jointly. In these applications, packets carrying sound components, action commands or other real-time information are sent over an NR network to be received and played-back or acted upon by multiple UEs, each reproducing sound or its particular action according to its repertoire. There are stringent requirements related to the time of play-out of each note or actuation between different UEs carrying out synergistic tasks in a factory. This requirement to minimise actuation jitter between UEs is called synchronicity. The formal synchronicity requirement, $\Delta$, can be stated as follows:

The i-th UE has a time t(i) at which to actuate;

The i-th UE must actuate within $t(i)\pm\Delta$.

The value $\Delta$ is the actuation jitter and differences in its value between multiple UEs results in low synchronicity. Actuation jitter increases can arise from a number of things. These include:

Differences in the propagation time between a gNodeB and each of the UEs concerned due, for example, to their varying distances from the gNodeB;

Variation in the processing time of a TB at different UEs due, for example, to differing numbers of FEC decoder iterations between UE receivers;

Differences in the decoding time of each packet due, for example, to differences in the number of HARQ retransmissions used at each UE;

Time offsets in the clocks of the different UEs; and

Differences in the scheduling times for transmissions to the different UEs.

Figure 4:
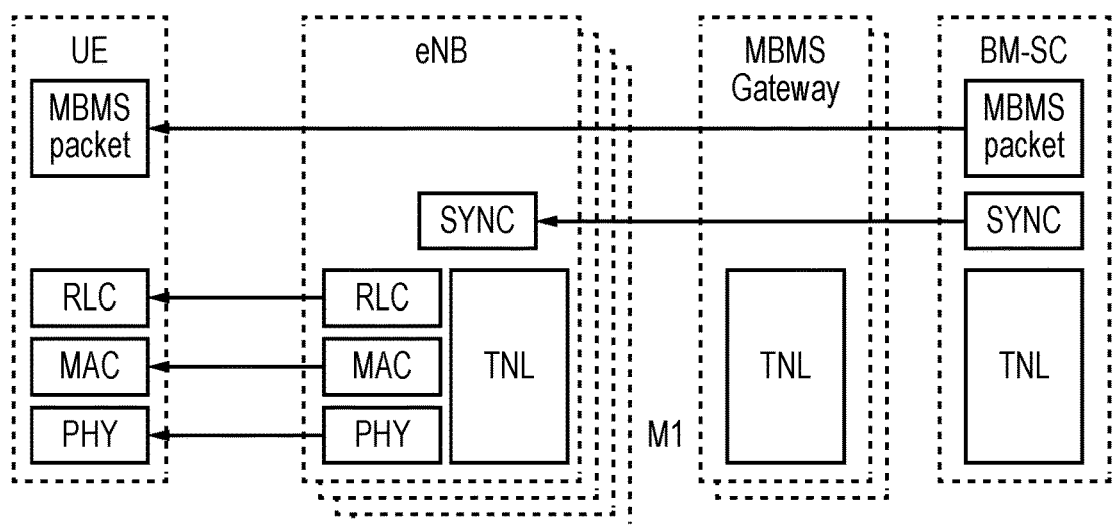
FIG. 4 is reproduced from [7], and shows the overall u-plane architecture of the MBMS content synchronisation.

One of the requirements is that the end to end delay should be 4 ms and synchronicity of 20 µs; i.e. the maximum value of $\Delta$ taken across all the UEs. The requirement also mentions the use of broadcast/multicast technologies. Broadcasting/multicasting to a large number of UEs at the same time at least mitigates the actuation jitter between UE that is due to differences in scheduling time for the transmissions to the different UEs. So far however, enhancements of Multimedia Broadcast and Multicast Services (MBMS) are only now being discussed for NR. Nevertheless, MBMS was enhanced in Rel-13 with the introduction of Single Cell Point to Multipoint (SC-PTM) [6]. The SC-PTM end-to-end delay is shown in Table I below, where BM-SC stands for the Broadcast-Multicast Service Centre, which is the interface between external broadcast/multicast content providers and the core network, SGW and PGW are the Server Gateway and Packet Data Network Gateway respectively, and where GCSE stands for Group Communication Services, which provide fast and efficient mechanisms to distribute the same content to multiple users in a controller manner. The SYNC protocol, as described in [7] is defined as a protocol which carries additional information which is used by eNodeBs to identify radio frame transmission timing and to detect packet loss. Every Evolved MBMS (E-MBMS) service uses its own SYNC entity. The SYNC protocol is applicable to the downlink, and is terminated in the BM-SC. FIG. 4 is reproduced from [7], and shows the overall u-plane architecture of the MBMS content synchronisation, including the SYNC protocol. In addition, enhancements related to Time Sensitive Networks (TSN) can be applied on the network side. This may include and not limited to techniques like credit based shaping, pre-emption of certain bearers, time aware queuing, cyclic queuing, input gating, seamless redundancy and use of stream reservation protocol in the network. TSN functionality may sit on top of the PDCP layer as an example.

TABLE I

| SC-PTM end-to-end delay | | |
|---|---|---|
| Description | Time(ms) | Comments |
| Talker UE → eNB | 10 | Reference: Annex B.2 of 3GPP TR 36.912 [5] |
| eNB → SGW/PGW → GCSE AS → BM-SC | 20 | Out of RAN WG2 scope, the value 20 ms, is shown as an example representative of the time required for the procedure. Backhaul transmission delay of 10ms on each network interface is assumed |
| BM-SC → eNB | 20 or 30 | Backhaul delay (M1) and node processing delay, without SYNC or with SYNC delay (i.e. SC-PTM scheduling period/2, with SC-PTM scheduling period of 20 ms). |
| Average delay due to SC-PTM scheduling period | 10 (20) | 20 ms SC-PTM scheduling period for DRX |
| eNB → Receiving UEs | 10 | Receiving and processing at the UE |
| Total | 70 (80) or 80 (90) | |

As can be seen from Table I, the SC-PTM end-to-end delay cannot satisfy the FS-CAV requirement of 4 ms and application level latency of 20 ms. Embodiments of the present technique therefore provide solutions focussed on solving the problems of how to meet synchronicity and end-to-end latency requirements for FS-CAV.

Ensuring Synchronicity in 5G

Embodiments of the present technique allow for the improvement in synchronicity between communications devices (UEs) which can ensure time-critical cooperative tasks are performed by the UEs at the correct time.

Figure 5:
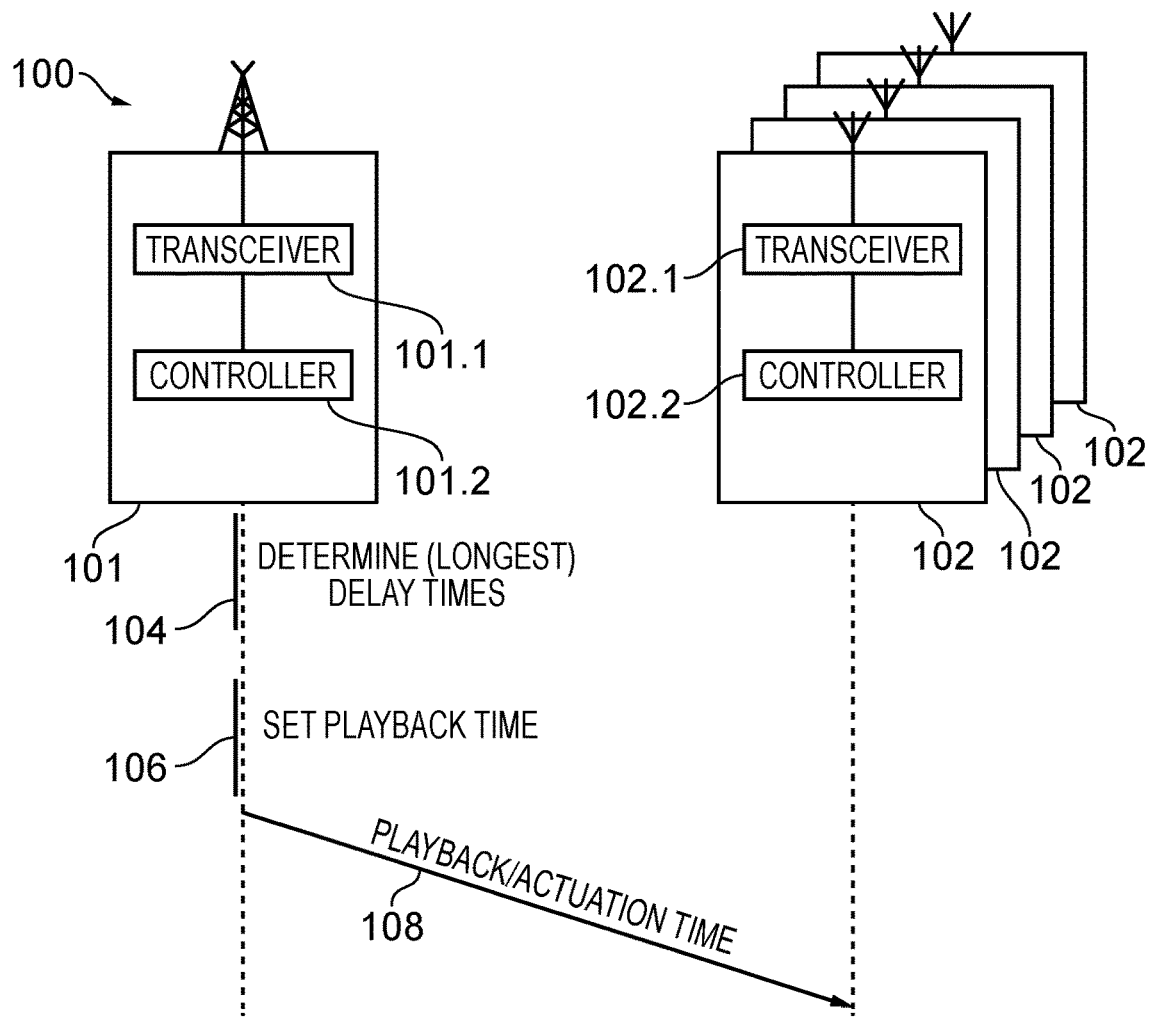
FIG. 5 shows a part schematic, part message flow diagram representation of a communications system comprising an infrastructure equipment and a plurality of communications devices in accordance with embodiments of the present technique.

FIG. 5 shows a part schematic, part message flow diagram representation of a communications system 100 in accordance with embodiments of the present technique. The communications system 100 comprises an infrastructure equipment 101 and a plurality of communications devices 102. Each of the infrastructure equipment 101 and communications devices 102 comprise a transceiver (or transceiver circuitry) 101.1, 102.1, and a controller (or controller circuitry) 102.1, 102.2. Each of the controllers 102.1, 102.2 may be, for example, a microprocessor, a CPU, or a dedicated chipset, etc.

As shown in FIG. 5, the controller circuitry 102.1 and the transceiver circuitry 101.1 of the infrastructure equipment are configured in combination to determine 104 a delay time for each of the plurality of communications devices 102, the delay time being a time taken for the each of the communications devices 102 to receive signals transmitted by the infrastructure equipment 101, to set 106 a playback time dependent on a longest of the delay times among the plurality of communications devices 102, the playback time being a time at which one or more of the communications devices 102 should transmit a signal, and to transmit 108 signals to each of the communications devices 102, the signals comprising an indication of the playback time. The signal that should transmitted by the communications devices at the playback time may be any one of a number of things, which include but are not limited to, simply passing on (i.e. "transmitting" in a broad sense) the received signals to the application layer, or transmitting a signal to an output unit of the communications device/UE such as a speaker or some other form of actuator, all depending on the function of that particular UE.

Essentially, embodiments of the present technique introduce ways in which a single packet or multiple packets being received on the downlink at a gNodeB from the core network and destined for different UEs shall be transmitted in such a way that all UEs shall playout or pass the packets on to the application layer at the same time. In legacy technologies, MBMS and SC-PTM comes a bit closer than others to meeting these requirements, but are unable to meet them fully as described above in relation to Table I. Neither MBSM nor SC-PTM have uplink feedback mechanisms, and instead rely on implementation-specific numbers of repetitions, which may have adverse effects such as increasing end-to-end latency or reducing capacity. As described above with reference to [7], there is a SYNC protocol used between BM-SC and an eNodeB in order to ensure synchronisation amongst all eNodeBs and also provide eNodeBs with a start time of a broadcast and an indication of lost packets (this refers to packets lost over network interfaces and not packets lost over the air).

In some embodiments of the present technique, the SYNC protocol is run between a gNodeB and a mobile edge computing (MEC) client/server at the gNodeB edge. In legacy MBMS/SC-PTM architecture, BM-SC performs IP multicast and each eNodeB joins the session and receives duplicated IP packets. In order to meet requirements for FS-CAV, either multicast functionality is moved to the edge or duplicate IP packets are made available at the edge, so that effectively, the BM-SC to eNodeB latency is eliminated.

A UE will know the configuration of SC-PTM/MBMS from broadcast (SIBs) signalling and starts receiving packets when a service becomes active. The UE is able to move across cells at the cell edge scenario and still receive packets simply because the radio configuration for reception of these packets does not change in different cells, which are part of a MBSFN (MBMS Single Frequency Network). So, a process according to embodiments of the present technique is split into the following parts for new applications having new latency and synchronicity requirements:

End to end synchronisation between application layer, 5GC, NR, and UE while taking a standardised clock as reference. Existing technologies like IEEE 1588v2 or Coordinated Universal Time (UTC) time broadcasted in SIB 16 in LTE are sufficient for this purpose. These are already present in the networks and UEs. In addition, the UE and a gNodeB synchronise the frame structure over the air. In one arrangement according to embodiments of the present technique, the SYNC protocol is used to inform the gNodeB about the timestamp of the start of the service, and also includes an indication of the number of packets being sent. This will ensure that the gNodeB is aware of timing as well as any packets lost. In another arrangement according to embodiments of the present technique, a combination of GNSS and IEEE1588 is used, and assistance information related to these timing references is broadcast by the base station. Currently, UTC information is provided in SIB 16, and one of the purposes mentioned is to determine the MBMS start/stop times of the service.

The gNodeB evaluates radio conditions of each UE, including the UEs which are not in so good radio conditions, and then feeds the evaluations back to the application layer. The application layer or gateway transmits packets to the gNodeB along with an indication of a play-out time, and the gNodeB performs the required repetitions in time and also indicates to UEs the play-out time. In one arrangement, a feedback mechanism is needed between the gNodeB and core network entity or application, and between the UE and gNodeB to ensure that play-out time for all UEs is synchronised. In other words, the controller circuitry is configured in combination with the transceiver circuitry to receive feedback information from one or more of the communications devices, wherein the delay time for the one or more of the communications devices is determined in accordance with the feedback information received from the one or more of the communications devices. The gNodeB may then be configured to transmit at least one of the feedback information received from the one or more of the communications devices and the delay times of the one or more of the communications devices to a core network part of the wireless communications network, and to receive, from the core network part, an indication of the playback time for the infrastructure equipment to transmit to the one or more of the communications devices. It is possible that contents such as the indication of the playback time may be held in an MEC server or in a BM-SC server, which are traditionally not part of the core network. An example of a feedback mechanism is described in the section below.

The UE radio layer then provides received packets to upper layers along with its playout time. The UE may additionally provide feedback in terms of radio measurements to the gNodeB.

Different data may be transmitted to different groups of UEs. For example, this may be the case in a scenario where UEs in robots working in a factory must perform a task cooperatively (such as placing nails by one group of robots/UEs while another group hammers them). In such a scenario, a UE may subscribe to one of the groups, and will receive different data from the gNodeB. It may be that different groups of UEs have slightly different playback times; for example, speakers at a concert may be required to play different parts of a note or chord starting at slightly different times. In other words, the controller circuitry is configured in combination with the transceiver circuitry to set a plurality of playback times each associated with a group of communications devices, each playback time being set dependent on a longest of the delay times among the communications devices of the associated group of communications devices, and to transmit each playback time to each of the communications devices in the associated group of communications devices.

The above mechanism is explained based on the assumption that all UEs are in the same cell. However, coordination between cells is additionally needed if UEs are distributed between cells.

Feedback Mechanism

One straightforward option is that SC-PTM is used for downlink transmissions, and at the same time, uplink feedback from each UE is taken into account while transmitting the packet on the downlink. This will ensure that the play out time on all UEs is synchronised, considering the propagation delay and HARQ retransmissions for the UEs in the worst radio conditions (i.e. weakest link) being used as a reference.

In one arrangement according to embodiments of the present technique, uplink feedback is introduced for broadcast technologies such as SC-PTM and MBMS, whereby UEs provide uplink feedback on configured resources.

Feedback resources could be configured in system information or in dedicated signalling, and the network can ensure that all UEs have equal opportunity to transmit uplink feedback, and at the same time, it is timely in nature. In other words, the controller circuitry is configured in combination with the transceiver circuitry to transmit signalling information providing an indication of communications resources of the wireless access interface in which the one or more of the communications devices should transmit the feedback information, wherein the feedback information is received from the one or more of the of the communications devices in the indicated communications resources.

In one arrangement according to embodiments of the present technique, the network may broadcast a threshold and only those UEs in radio conditions below the configured threshold need to transmit the feedback information. In other words, the controller circuitry is configured in combination with the transceiver circuitry to broadcast a threshold quality of signals communicated over the wireless access interface, and to receive the feedback information from the one or more of the communications devices dependent on whether a quality of signals transmitted by and/or received from each of the one or more of the communications devices over the wireless access interface is below the threshold quality.

This feedback information could be a single bit indicating that the UE is in bad radio conditions. In other words, the feedback information comprises a single bit indicating whether or not the quality of signals transmitted by and/or received from each of the one or more of the communications devices over the wireless access interface is below the threshold quality. Alternatively, multiple bits could be used and each value corresponds to a certain coverage level. In other words, the feedback information comprises a plurality of bits, the plurality of bits indicating which of a plurality of predetermined coverage levels each of the one or more of the communications devices is in, each of the coverage levels having an associated range of quality of signals transmitted by and/or received from each of the one or more of the communications devices over the wireless access interface.

The UE could also report absolute RSRP/RSRP/RSSI/CQI values or in addition to above bit(s) as well. This way, the network will be able to calculate the number of retransmissions and/or repetitions needed before playout, and also interpret the number of UEs in bad radio coverage. Uplink feedback will not directly reduce the end-to-end latency, but will provide gNodeBs with the potential number of retransmissions required so that they can take this value into account. A gNodeB may as a result increase power and/or reduce its modulation and coding scheme (MCS) in order to reduce the number of retransmissions/repetitions for cell edge UEs. Alternatively, the network may choose unicast for poor coverage UEs to ensure timely delivery and utilise a proper feedback mechanism.

Achieving ≤9 ms Latency With NR Broadcast/Multicast

In cases where one person is speaking on a microphone (i.e. a user of a UE which is providing uplink traffic) and speakers (i.e. UEs playing downlink traffic) in the room playout his/her speech, then uplink resources are allocated while taking into account the delay for uplink transmissions, and then also considering the downlink delay for transmission of packets to each speaker UE.

TABLE II

SC-PTM end-to-end delay for NR

| Description | Time (ms) | Comments | Estimated Values for NR |
|---|---|---|---|
| Talker UE → eNB | 10 | Reference: Annex B.2 of 3GPP TR 36.912 [5] | 3 ms if 5QI with Packet Delay Budget of 5 ms is deployed. |
| eNB → SGW/ PGW → GCSE AS → BM-SC | 20 | Out of RAN WG2 scope, the value 20 ms, is shown as an example representative of the time required for the procedure. Backhaul transmission delay of 10 ms on each network interface is assumed | With MEC, this can be reduced to 2 ms |
| BM-SC → eNB | 20 or 30 | Backhaul delay (M1) and node processing delay, without SYNC or with SYNC delay (i.e. SC-PTM scheduling period/2, with SC-PTM scheduling period of 20 ms). | Not applicable if MEC is in hand |
| Average delay due to SC-PTM scheduling period | 10 (20) | 20 ms SC-PTM scheduling period for DRX | $C-PTM scheduling could be more frequent e.g. 1 ms or less |
| eNB → Receiving UEs | 10 | Receiving and processing at the UE | 3 ms if 5QI with PDB of 5 ms is used |
| Total | 70 (80) or 80 (90) | | 9 ms-this is end-to-end round trip latency. The requirement is end to end single way of 4 sec. |

This value for SC-PTM end-to-end delay is shown in Table I above. However, NR provides opportunities to reduce the end-to-end latency to around 9 ms. Table I is reproduced as Table II above, which comprises new values for NR in the last column.

In embodiments of the present technique, methods for enhancing the SC-PTM or MBMS based system which will help achieve the required latency may be employed.

Due to the characteristics of the PDSCH physical layer channel, it should be possible to schedule SC-PTM PDSCH effectively in every subframe or in the order of fraction of ms. The only limitation will be that the UEs should be capable of separating normal user traffic sent over PDSCH, and SC-PTM traffic over PDSCH and radio resources are not over-reserved.

SC-PTM allows one-to-one mapping between a TMGI value associated with a service and physical layer G-RNTI addressing a SC-MTCH (SC-Multicast Traffic Channel) logical channel. In other words, only one service is scheduled during a TTI or scheduling period and all UEs monitor the same G-RNTI on physical layer. As an enhancement when either faster scheduling is required or different services need to be multiplexed in radio protocols, then one arrangement in accordance with embodiments of the present technique is that multiple G-RNTIs are scheduled during the same time interval (or same scheduling frame or slot or time/frequency resource). In other words, the controller circuitry is configured in combination with the transceiver circuitry to allocate to each of the communications devices, communications resources of the wireless communications network in which the communications devices should transmit a second signal at the playback time, wherein the communications resources allocated to each of the communications devices occupy a same time period and having one of a plurality of group identifiers, each of the group identifiers being associated with a group of one or more of the communications devices. A communications device may be a member of more than one group, and so may monitor more than one of the group identifiers (G-RNTI), and so may receive more than one type of data in the same time period (scheduling time).

Figure 6:
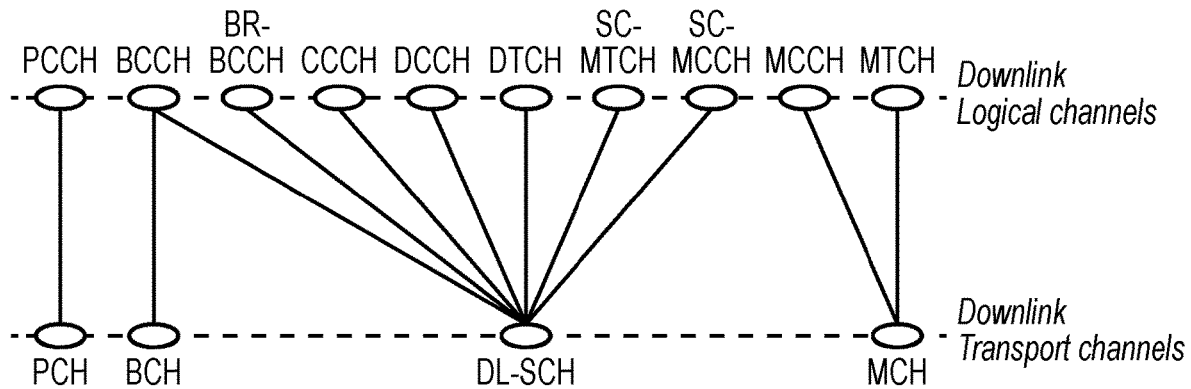
FIG. 6 is reproduced from [7], and shows the mapping between downlink logical channels and downlink transport channels.

Since this will change the physical layer structure, only a fixed number of G-RNTIs can be included and any change will not be backward compatible, leaving many legacy UEs unable to receive services addressed by newly added G-RNTIs in the same scheduling opportunity. As an alternative arrangement, multiple services addressed with different TMGIs and carried over different MTCHs are multiplexed in lower layers. For example, layer 2 (2 MTCHs mapped to one transport channel and header information include information about separate MTCH) and then scheduled with the same G-RNTI. Multiplexing already exists in MBMS, but not in SC-PTM. The MBMS transport channel and physical channel are different compared to SC-PTM transport and physical channel. FIG. 6 is reproduced from [7], and shows the mapping between downlink logical channels and downlink transport channels.

Embodiments of the present technique can be employed to determine the overall delay of wireless communications networks, and help decide whether to move the contents to a local cache using MEC by learning and optimising end-to-end delay. In an arrangement according to embodiments of the present technique, the application layer at the gNodeB may ping to determine max(di) across all of the UEs where di is the one way delay between the egress of a PDU from the application layer at the gNodeB and its exit at the UE into the application. The delay (di) is dependent on the propagation time between the gNB and UE(i) from which is determined the timing advance for UE(i) and the number of HARQ processes needed for UE(i) at a given relative location of the gNB and UE and the resource grant time per UE. Knowing max(di) across all of the UEs, the actuation time for each packet is then set for all UEs to max(di). This means that the actuation time is determined by the actuation time of the UE that would actuate last if all UEs were allowed to actuate immediately the packet exits into their application. It should be clear that the setting of the actuation time also takes into account the highest number of HARQ processes that are needed by the UE that is suffering the worst propagation conditions. The ping signal is similar to a RACH preamble to allow its propagation time to be measured. The actuation time indicates the real-time instant when the actuation due to the received packet should take place. In other words, the controller circuitry is configured in combination with the transceiver circuitry to transmit a test signal to each of the communications devices, and to receive a response to the test signal from each of the communications devices, wherein the delay time for each of the communications devices is determined from a time taken from transmitting the test signal to receiving the response to the test signal from the each of the communications devices.

Once set, the actuation time is valid unless propagation conditions between the gNB and some of the UEs change so drastically as to affect any of (a), (b) and (c) above. In other words, the controller circuitry is configured in combination with the transceiver circuitry to determine that a quality of signals transmitted to or received from one or more of the communications devices has fallen below a second threshold quality of signals, to change the playback time in response to determining that the quality of signals transmitted to or received from the one or more of the communications devices has fallen below the second threshold, and to transmit signals to each of the communications devices, the signals comprising an indication of the changed playback time.

Of the propagation conditions that may change drastically as to affect any of (a), (b) and (c) above, a change in the required number of HARQ processes has the highest impact. Such changes can stem for example, from relative motion between the gNB and the UEs.

Physical layer processes that try to maintain the HARQ processes within the largest considered in max(di)

Repeat transmissions as long as these are scheduled for reception by each UE within max(d(i))

Multiple simultaneous transmissions (from more than one gNB) to provide spatial diversity Frequency domain multiple simultaneous transmissions (from one gNB) to provide frequency diversity The clocks at the UEs have to be mutually synchronous in order to adhere to the actuation time.

Flow Chart Representation

Figure 7:
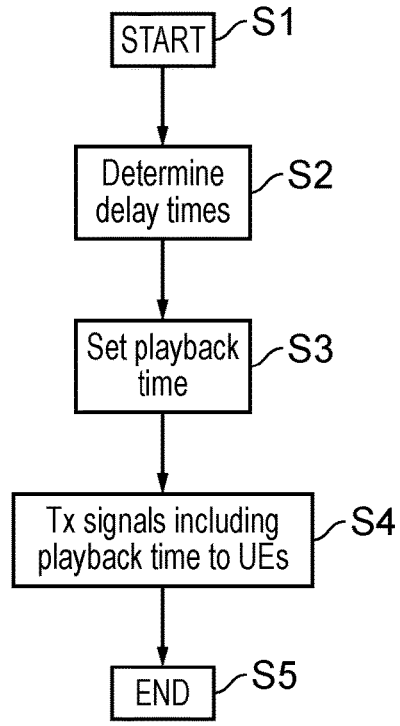
FIG. 7 is a flow diagram representation of a method of operating an infrastructure equipment according to embodiments of the present technique.

FIG. 7 shows a flow diagram illustrating a process of communications in a communications system in accordance with embodiments of the present technique. The process shown by FIG. 7 is a method of operating an infrastructure equipment forming part of a wireless communications network.

The method begins in step S1. The method comprises, in step S2, determining a delay time for each of a plurality of communications devices, the delay time being a time taken for the each of the communications devices to receive signals transmitted by the infrastructure equipment. In step S3, the process comprises setting a playback time dependent on a longest of the delay times among the plurality of communications devices, the playback time being a time at which one or more of the communications devices should transmit a signal. The method then advances to step S4, which comprises transmitting signals to each of the communications devices, the signals comprising an indication of the playback time. The process ends in step S5.

Those skilled in the art would appreciate that the method shown by FIG. 7 may be adapted in accordance with embodiments of the present technique. For example, other intermediate steps may be included in the method, or the steps may be performed in any logical order.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. An infrastructure equipment forming part of a wireless communications network comprising transceiver circuitry configured to transmit signals to and to receive signals from communications devices via a wireless access interface provided by the wireless communications network, and controller circuitry configured in combination with the transceiver circuitry to determine a delay time for each of a plurality of communications devices, the delay time being a time taken for the each of the communications devices to receive signals transmitted by the infrastructure equipment, to set a playback time dependent on a longest of the delay times among the plurality of communications devices, the playback time being a time at which one or more of the communications devices should transmit a signal, and to transmit signals to each of the communications devices, the signals comprising an indication of the playback time.

Paragraph 2. An infrastructure equipment according to Paragraph 1, wherein the controller circuitry is configured in combination with the transceiver circuitry to set a plurality of playback times each associated with a group of communications devices, each playback time being set dependent on a longest of the delay times among the communications devices of the associated group of communications devices, and to transmit each playback time to each of the communications devices in the associated group of communications devices.

Paragraph 3. An infrastructure equipment according to Paragraph 1 or Paragraph 2, wherein the controller circuitry is configured in combination with the transceiver circuitry to receive feedback information from one or more of the communications devices, wherein the delay time for the one or more of the communications devices is determined in accordance with the feedback information received from the one or more of the communications devices.

Paragraph 4. An infrastructure equipment according to Paragraph 3, wherein the controller circuitry is configured in combination with the transceiver circuitry to transmit at least one of the feedback information received from the one or more of the communications devices and the delay times of the one or more of the communications devices to a core network part of the wireless communications network, and to receive, from one of the core network part and a server external to the core network part, an indication of the playback time for the infrastructure equipment to transmit to the one or more of the communications devices.

Paragraph 5. An infrastructure equipment according to Paragraph 3 or Paragraph 4, wherein the controller circuitry is configured in combination with the transceiver circuitry to transmit signalling information providing an indication of communications resources of the wireless access interface in which the one or more of the communications devices should transmit the feedback information, wherein the feedback information is received from the one or more of the of the communications devices in the indicated communications resources.

Paragraph 6. An infrastructure equipment according to any of Paragraphs 3 to 5, wherein the controller circuitry is configured in combination with the transceiver circuitry to broadcast a threshold quality of signals communicated over the wireless access interface, and to receive the feedback information from the one or more of the communications devices dependent on whether a quality of signals transmitted by and/or received from each of the one or more of the communications devices over the wireless access interface is below the threshold quality.

Paragraph 7. An infrastructure equipment according to Paragraph 6, wherein the feedback information comprises a single bit indicating whether or not the quality of signals transmitted by and/or received from each of the one or more of the communications devices over the wireless access interface is below the threshold quality.

Paragraph 8. An infrastructure equipment according to Paragraph 6 or Paragraph 7, wherein the feedback information comprises a plurality of bits, the plurality of bits indicating which of a plurality of predetermined coverage levels each of the one or more of the communications devices is in, each of the coverage levels having an associated range of quality of signals transmitted by and/or received from each of the one or more of the communications devices over the wireless access interface.

Paragraph 9. An infrastructure equipment according to any of Paragraphs 1 to 8, wherein the controller circuitry is configured in combination with the transceiver circuitry to allocate to each of the communications devices, communications resources of the wireless communications network in which the communications devices should transmit a second signal at the playback time.

Paragraph 10. An infrastructure equipment according to Paragraph 9, wherein the communications resources allocated to each of the communications devices occupy a same time period and having one of a plurality of group identifiers, each of the group identifiers being associated with a group of one or more of the communications devices.

Paragraph 11. An infrastructure equipment according to any of Paragraphs 1 to 10, wherein the controller circuitry is configured in combination with the transceiver circuitry to transmit a test signal to each of the communications devices, and to receive a response to the test signal from each of the communications devices, wherein the delay time for each of the communications devices is determined from a time taken from transmitting the test signal to receiving the response to the test signal from the each of the communications devices.

Paragraph 12. An infrastructure equipment according to Paragraph 11, wherein the controller circuitry is configured in combination with the transceiver circuitry to determine that a quality of signals transmitted to or received from one or more of the communications devices has fallen below a second threshold quality of signals, to change the playback time in response to determining that the quality of signals transmitted to or received from the one or more of the communications devices has fallen below the second threshold, and to transmit signals to each of the communications devices, the signals comprising an indication of the changed playback time.

Paragraph 13. A method of operating an infrastructure equipment forming part of a wireless communications network, the method comprising determining a delay time for each of a plurality of communications devices, the delay time being a time taken for the each of the communications devices to receive signals transmitted by the infrastructure equipment, setting a playback time dependent on a longest of the delay times among the plurality of communications devices, the playback time being a time at which one or more of the communications devices should transmit a signal, and transmitting signals to each of the communications devices, the signals comprising an indication of the playback time.

Paragraph 14. Circuitry for an infrastructure equipment forming part of a wireless communications network comprising transceiver circuitry configured to transmit signals to and to receive signals from communications devices via a wireless access interface provided by the wireless communications network, and controller circuitry configured in combination with the transceiver circuitry to determine a delay time for each of a plurality of communications devices, the delay time being a time taken for the each of the communications devices to receive signals transmitted by the infrastructure equipment, to set a playback time dependent on a longest of the delay times among the plurality of communications devices, the playback time being a time at which one or more of the communications devices should transmit a signal, and to transmit signals to each of the communications devices, the signals comprising an indication of the playback time.

Paragraph 15. A communications device for communicating with an infrastructure equipment forming part of a wireless communications network comprising transceiver circuitry configured to transmit signals and to receive signals via a wireless access interface provided by the wireless communications network, and controller circuitry configured to control the transceiver circuitry to transmit feedback information to the infrastructure equipment, to receive a first signal from the infrastructure equipment, the first signal comprising an indication of a playback time determined based on the transmitted feedback information associated and on feedback information transmitted by one or more other communications devices, and to transmit, in response to receiving the first signal, a second signal at the indicated playback time.

Paragraph 16. A method of operating a communications device for communicating with an infrastructure equipment forming part of a wireless communications network, the method comprising transmitting feedback information to the infrastructure equipment, receiving a first signal from the infrastructure equipment, the first signal comprising an indication of a playback time determined based on the transmitted feedback information associated and on feedback information transmitted by one or more other communications devices, and transmitting, in response to receiving the first signal, a second signal at the indicated playback time.

Paragraph 17. Circuitry for a communications device for communicating with an infrastructure equipment forming part of a wireless communications network comprising transceiver circuitry configured to transmit signals and to receive signals via a wireless access interface provided by the wireless communications network, and controller circuitry configured to control the transceiver circuitry to transmit feedback information to the infrastructure equipment, to receive a first signal from the infrastructure equipment, the first signal comprising an indication of a playback time determined based on the transmitted feedback information associated and on feedback information transmitted by one or more other communications devices, and to transmit, in response to receiving the first signal, a second signal at the indicated playback time.

Paragraph 18. A communications device for communicating with an infrastructure equipment forming part of a wireless communications network comprising transceiver circuitry configured to transmit signals and to receive signals via a wireless access interface provided by the wireless communications network, and controller circuitry configured to control the transceiver circuitry to receive a first signal from the infrastructure equipment, the first signal comprising an indication of plurality of playback times, each of the playback times being associated with a group of communications devices, to determine which of the groups of communications devices the communications device belongs to, and to transmit, in response to receiving the first signal, a second signal at one of the indicated playback times, the one of the indicated playback times being associated with the determined one of the groups of communications devices.

Paragraph 19. A method of operating a communications device for communicating with an infrastructure equipment forming part of a wireless communications network, the method comprising receiving a first signal from the infrastructure equipment, the first signal comprising an indication of plurality of playback times, each of the playback times being associated with a group of communications devices, determining which of the groups of communications devices the communications device belongs to, and transmitting, in response to receiving the first signal, a second signal at one of the indicated playback times, the one of the indicated playback times being associated with the determined one of the groups of communications devices.

Paragraph 20. Circuitry for a communications device for communicating with an infrastructure equipment forming part of a wireless communications network comprising transceiver circuitry configured to transmit signals and to receive signals via a wireless access interface provided by the wireless communications network, and controller circuitry configured to control the transceiver circuitry to receive a first signal from the infrastructure equipment, the first signal comprising an indication of plurality of playback times, each of the playback times being associated with a group of communications devices, to determine which of the groups of communications devices the communications device belongs to, and to transmit, in response to receiving the first signal, a second signal at one of the indicated playback times, the one of the indicated playback times being associated with the determined one of the groups of communications devices.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] RP-172834, "Revised WID on New Radio Access Technology," NTT DOCOMO, RAN #78.
[3] TR 38.913, "Study on Scenarios and Requirements for Next Generation Access Technologies (Release 14)".
[4] 3GPP Organisation, "5G Communication for Automation in Vertical Domains", [Online], Available at: http://www.3gpp.org/news-events/3gpp-news/1839-5g_cc_automation, Mar. 14, 2017.
[5] TR 36.912, "Feasibility study for Further Advancements for E-UTRA (LTE-Advanced) (Release 9)".
[6] 3GPP Organisation, "SC-PTM, an agile broadcast/multicast mechanism", [Online], Available at: http://www.3gpp.org/more/1763-sc_ptm, Jan. 28, 2016.
[7] TS 36.300, "LTE; Evolved Universal Terrestrial Radio Access (E-UTRA) and Evolved Universal Terrestrial Radio Access Network (E-UTRAN); Overall description; Stage 2 (Release 13)".

What is claimed is:

1. An infrastructure equipment forming part of a fifth generation New Radio (5G NR) wireless communications network comprising:

transceiver circuitry configured to transmit signals to and to receive signals from communications devices via a wireless access interface provided by the 5G NR wireless communications network, and
controller circuitry configured in combination with the transceiver circuitry
to receive feedback information from each of the communications devices as at least some of the received signals on configured resources according to Multimedia Broadcast and Multi cast Services (MBMS) from the infrastructure equipment,
to determine a delay time for each of a plurality of communications devices, the delay time being a one-way time taken for the each of the communications devices to receive the signals transmitted by the infrastructure equipment, and the delay time for each of the communications devices is determined in accordance with the feedback information received from the communications devices,
to set a playback time dependent on a longest of the delay times among the plurality of communications devices, the playback time being a time at which one or more of the communications devices should transmit a signal, and
to transmit the signals to each of the communications devices, the signals comprising an indication of the playback time for the communication devices to transmit at least one downlink packet from the infrastructure equipment at a same time.

2. An infrastructure equipment according to claim 1, wherein the controller circuitry is configured in combination with the transceiver circuitry
to set a plurality of playback times each associated with a group of communications devices, each playback time being set dependent on a longest of the delay times among the communications devices of the associated group of communications devices, and
to transmit each playback time to each of the communications devices in the associated group of communications devices.

3. An infrastructure equipment according to claim 1, wherein the controller circuitry is configured in combination with the transceiver circuitry
to transmit at least one of the feedback information received from the one or more of the communications devices and the delay times of the one or more of the communications devices to a core network part of the wireless communications network, and
to receive, from one of the core network part and a server external to the core network part, an indication of the playback time for the infrastructure equipment to transmit to the one or more of the communications devices.

4. An infrastructure equipment according to claim 1, wherein the controller circuitry is configured in combination with the transceiver circuitry
to transmit signalling information providing an indication of communications resources of the wireless access interface in which the one or more of the communications devices should transmit the feedback information,
wherein the feedback information is received from the one or more of the communications devices in the indicated communications resources.

5. An infrastructure equipment according to claim 1, wherein the controller circuitry is configured in combination with the transceiver circuitry
to broadcast a threshold quality of signals communicated over the wireless access interface, and to receive the feedback information from the one or more of the communications devices dependent on whether a quality of signals transmitted by and/or received from each of the one or more of the communications devices over the wireless access interface is below the threshold quality.

6. An infrastructure equipment according to claim 5, wherein the feedback information comprises a single bit indicating whether or not the quality of signals transmitted by and/or received from each of the one or more of the communications devices over the wireless access interface is below the threshold quality.

7. An infrastructure equipment according to claim 5, wherein the feedback information comprises a plurality of bits, the plurality of bits indicating which of a plurality of predetermined coverage levels each of the one or more of the communications devices is in, each of the coverage levels having an associated range of quality of signals transmitted by and/or received from each of the one or more of the communications devices over the wireless access interface.

8. An infrastructure equipment according to claim 1, wherein the controller circuitry is configured in combination with the transceiver circuitry
to allocate to each of the communications devices, communications resources of the wireless communications network in which the communications devices should transmit a second signal at the playback time.

9. An infrastructure equipment according to claim 8, wherein the communications resources al located to each of the communications devices occupy a same time period and having one of a plurality of group identifiers, each of the group identifiers being associated with a group of one or more of the communications devices.

10. An infrastructure equipment according to claim 1, wherein the controller circuitry is configured in combination with the transceiver circuitry
to transmit a test signal to each of the communications devices, and
to receive a response to the test signal from each of the communications devices, wherein the delay time for each of the communications devices is determined from a time taken from transmitting the test signal to receiving the response to the test signal from the each of the communications devices.

11. An infrastructure equipment according to claim 10, wherein the controller circuitry is configured in combination with the transceiver circuitry
to determine that a quality of signals transmitted to or received from one or more of the communications devices has fallen below a second threshold quality of signals,
to change the playback time in response to determining that the quality of signals transmitted to or received from the one or more of the communications devices has fallen below the second threshold, and
to transmit signals to each of the communications devices, the signals comprising an indication of the changed playback time.

12. An infrastructure equipment according to claim 1, wherein the transmitting of the at least one downlink packet at the same time is one of passing on the at least one downlink packet to an application layer of the communication device or outputting the at least one downlink packet from an actuator of the communications device.

13. A method of operating an infrastructure equipment forming part of a fifth generation New Radio (5G NR) wireless communications network, the method comprising:
receiving feedback information from each of a plurality of communications devices on configured resources according to Multimedia Broadcast and Multicast Services (MBMS) from the infrastructure equipment:
determining a delay time for each of the plurality of communications devices, the delay time being a one-way time taken for the each of the communications devices to receive signals transmitted by the infrastructure equipment of the 5G NR wireless communication network, and the delay time for each of the communications devices is determined in accordance with the feedback information received from the communications devices,
setting a playback time dependent on a longest of the delay times among the plurality of communications devices, the playback time being a time at which one or more of the communications devices should transmit a signal, and
transmitting signals to each of the communications devices, the signals comprising an indication of the playback time for the communication devices to transmit at least one downlink packet from the infrastructure equipment at a same time.

14. The method according to claim 13, further comprising:
setting a plurality of playback times each associated with a group of communications devices, each playback time being set dependent on a longest of the delay times among the communications devices of the associated group of communications devices; and
transmitting each playback time to each of the communications devices in the associated group of communications devices.

15. The method according to claim 13, further comprising:
transmitting at least one of the feedback information received from the one or more of the communications devices and the delay times of the one or more of the communications devices to a core network part of the wireless communications network; and
receiving, from one of the core network part and a server external to the core network part, an indication of the playback time for the infrastructure equipment to transmit to the one or more of the communications devices.

16. The method according to claim 13, further comprising:
transmitting signalling information providing an indication of communications resources of the wireless access interface in which the one or more of the communications devices should transmit the feedback information,
wherein the feedback information is received from the one or more of the communications devices in the indicated communications resources.

17. The method according to claim 13, further comprising:
broadcasting a threshold quality of signals communicated over the wireless access interface; and
receiving the feedback information from the one or more of the communications devices dependent on whether a quality of signals transmitted by and/or received from each of the one or more of the communications devices over the wireless access interface is below the threshold quality.

18. Circuitry for an infrastructure equipment forming part of a fifth generation New Radio (5G NR) wireless communications network comprising:

transceiver circuitry configured to transmit signals to and to receive signals from communications devices via a wireless access interface provided by the 5G NR wireless communications network, and controller circuitry configured in combination with the transceiver circuitry
- to receive feedback information from each of the communications devices as at least some of the received signals on configured resources according to Multimedia Broadcast and Multicast Services (MBMS) from the infrastructure equipment
- to determine a delay time for each of a plurality of communications devices, the delay time being a one-way- time taken for the each of the communications devices to receive the signals transmitted by the infrastructure equipment, and the delay time for each of the communications devices is determined in accordance with the feedback information received from the communications devices,
- to set a playback time dependent on a longest of the delay times among the plurality of communications devices, the playback time being a time at which one or more of the communications devices should transmit a signal, and
- to transmit the signals to each of the communications devices, the signals comprising an indication of the playback time for the communication devices to transmit at least one downlink packet from the infrastructure equipment at a same time.

* * * * *